Figure 1:
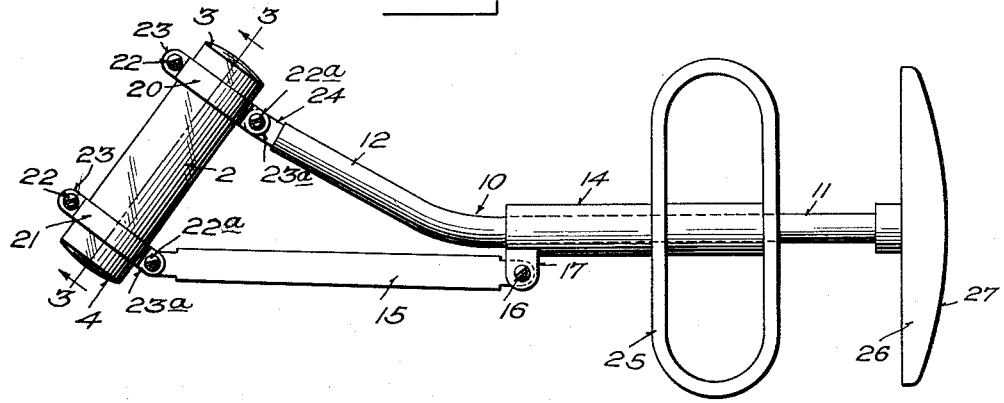

March 27, 1951 — I. C. GARDNER — 2,546,154

GAUGE

Filed Aug. 10, 1944

Inventor
IRVINE C. GARDNER,
C. E. Herrstrom & A. E. Thibodeau
Attorneys

Patented Mar. 27, 1951

2,546,154

UNITED STATES PATENT OFFICE 2,546,154

GAUGE

Irvine C. Gardner, Chevy Chase, Md.

Application August 10, 1944, Serial No. 548,878

2 Claims. (Cl. 33—178)

(Granted under the act of March 3, 1883, as amended April 30, 1928; 370 O. G. 757)

The invention described herein may be manufactured and used by or for the Government for governmental purposes without the payment to me of any royalty thereon.

This invention relates to gages for gaging the diameters of cylindrical holes or boring in metal or metal parts. It relates more especially to gages of the type stated which are made of glass, and sometimes referred to as glass gages.

Among the objects of the present invention is the provision of gages constructed of siliceous or vitreous material such as glass, fused quartz, crystalline quartz and agate which are suitable for use in gaging the diameters of cylindrical holes and borings, which are very sensitive in indicating diameters departing from the gage, and which may be used with entirely satisfactory results even by an inexperienced mechanic, gager or checker.

Another object of the present invention is the provision of gages particularly adapted for gaging cylindrical holes and borings which are accessible from only one end. With a conventional plug gage it is impossible to determine whether or not such an opening enlarges beyond the entrance, and the present gages overcome this objection in the use of plug gages.

Other objects of the invention are apparent from, or are explained in, the detailed description of the invention hereinafter given.

One form of gaging member according to the present invention consists of a rod or columnar member having at each end antipodal spherical surfaces and therefore having the same curvature and same center of curvature. As a consequence of the spherical surfaces being antipodal, the concavities of the spherical surfaces face each other, the radii of the spherical surfaces at the ends of the rod or columnar portion are of the same length or dimension, and all diametrically opposite points of the two surfaces are equal distances apart. Thus, the maximum measuring or gaging dimension of the gage member is the diameter of a sphere of a radius equal to the radius of the antipodal spherical surface of the gage.

In another modification of the invention, instead of making the two spherical surfaces at the ends of the rod or columnar portion of the same radius, one of them is made with a slightly smaller radius than the other. In this modification of the invention, the centers of the curvatures of the two spherical surfaces, although different, both lie spaced apart in a straight line joining the two spherical surfaces, which line coincides with the line joining the two points in said surfaces which are a maximum distance apart. Stated in other words, a straight line drawn through the two centers of curvature of the two spherical surfaces intersects both spherical surfaces at the end of the rod or columnar body.

A common characteristic of the modifications of gages referred to above consists in this that at least one of the spherical surfaces at the ends of the gage has a radius of curvature of half the maximum distance between two spherical surfaces.

Another common characteristic of the modifications of gages referred to above consists in this that a straight line drawn through the centers of curvatures of the two spherical surfaces at the ends of the gage, irrespective whether these centers are coincident or spaced apart from each other, intersects both spherical surfaces of the gage.

The columnar body or portion at the ends of which the spherical surfaces are located may be round, square, hexagonal or other shapes in cross section at right angles to their length or height, and they may be uniform or non-uniform in cross section throughout their height. As a general rule, the columnar body should be sufficiently reduced in cross section, as compared with its length, or gaging dimension, to permit insertion and tilting of the columnar body in the hole or boring to be gaged.

Two embodiments of the invention are illustrated in the accompanying drawings and described in the description hereinafter given. In these drawings in which the same numeral or character of reference indicates the same or corresponding part in the several views, Figure 1 is a side elevation of a gage according to the invention carried in a mount or holder therefor, Figure 2 shows the gage and mount, in side elevation, in use in gaging the diameter of a cylindrical hole or boring, Figure 3 is a longitudinal central section on the line 3—3 of the gage shown in Fig. 1, but upon a somewhat larger scale, Figure 4 is a cross section on the line 4—4 of Fig. 2.

Figure 3:
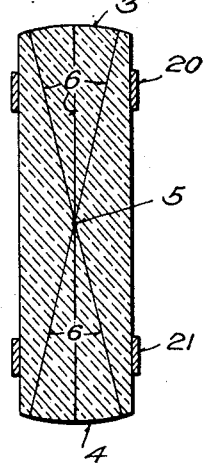
Figure 5:
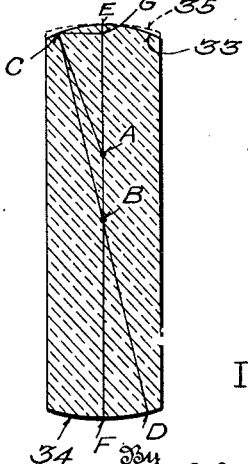

Figure 5 is a view similar to Fig. 3 of another form of the gage.

Figure 2:
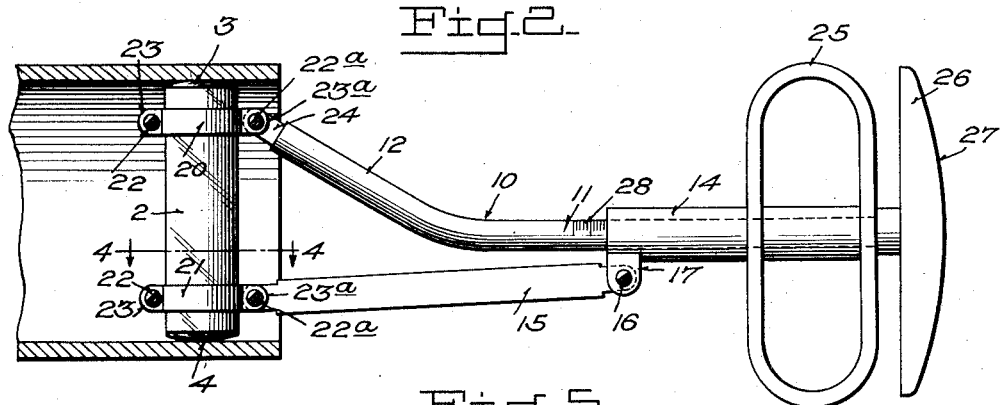
Figure 4:
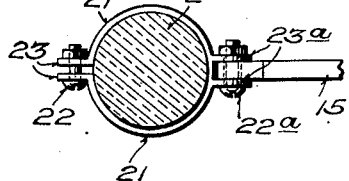

The gage shown in elevation in Figures 1 and 2 and in longitudinal section, and cross section in Figures 3 and 4 respectively, consists of a borosilicate crown glass rod or columnar portion 2 having a spherical surface 3 at one end and a spherical surface 4 at the other end. The radii of curvature of these two spherical surfaces are equal to each other and their centers of curvature are coincident at the point 5 within the columnar body portion 2. Lines 6 extending from surface 3 to surface 4 and passing through point 5 are, therefore, diameters of a sphere whose center is the point 5, and spherical surfaces 3 and 4 are antipodal surfaces of this sphere.

A useful mount for this gage is illustrated in Figs. 1 and 2. This mount comprises a rod 10 consisting of two portions 11 and 12 at an obtuse angle. A sleeve 14 slidingly engages rod portion 11. A link 15 is pivoted at 16 to an ear 17, or between a pair of such ears, carried at the forward end of sleeve 14.

The body or columnar portion 2 of the gage is engaged by two like split ring clamps 20 and 21 (see Figs. 1, 2 and 4) held in engagement on body portion 2 by bolts or screws 22 passing through openings in the ears 23 on each of the ring clamps.

The end of rod 12 has opposed flat sides 24 which fit between the two ears 23a on ring clamp 20 and is pivoted in position therebetween on pin or bolt 22a which passes through the said ears.

Link 15 is pivoted, at the end remote from pivot 16, on the pin or bolt 22a that passes through the two ears 23a on ring clamp 21, as shown in Figures 1, 3 and 4.

Attached to sliding sleeve 14 is loop 25; and attached to the end of rod 11 is a rod or bar 26, preferably provided with an arcuate surface 27. Loop 25 and bar 26 serve as hand grips. When loop 25 and bar 26 are lightly gripped simultaneously by the hand of the user and the hand thereafter closed, sleeve 14 is drawn towards bar 26 and the gage 2 is rotated counterclockwise, as viewed in Fig. 1, from the inclined position shown in Fig. 1 to or towards the vertical or diametrical position shown in Fig. 2.

The modification of the gage shown in longitudinal central section in Fig. 5 is in all respects like the gage shown in Figures 1 to 4 inclusive, with the exception, however, that the spherical surfaces at the ends of the gage have slightly different radii of curvature and the centers of their curvatures are spaced apart. As pointed out above, a straight line drawn through the two separated centers of curvature intersects both spherical surfaces at the end of the gage. Point A represents the center of curvature of spherical surface 33, while point B represents the center of curvature of the spherical surface 34. Line AC represents the radius of curvature of spherical surface 33, and lines BD, BE and BF each represent the radius of curvature of spherical surface 34, an antipodal surface of which is indicated by the dotted line 35 adjacent spherical surface 33. Spherical surfaces 33 and 35 are contiguous at the point E, so that point E is common to both surfaces. The extent of separation between points or centers A and B has been accentuated in order that Fig. 5 may more clearly illustrate the principle of this modification of the gage. It will be understood that points E and F are diametrically opposite points of a sphere whose radius is equal to BF, and that BF is equal to BD and BE.

If from any point in the spherical surface 33, other than point E, a line CD is drawn through the center B of spherical surface 34 to the latter surface, such a line will be shorter than line EF, and this difference in length will depend upon the value of angle CBE, or upon the diameter of a small circle whose radius is represented by the line CG. If the diameter of this small circle is represented by the letter $d$ and the letter $a$ represents the distance between centers A and B, then the length of line CD is approximately given by the following equation:

$$CD = EF - \frac{ad^2}{2(EF)^2}$$

As an illustrative example, assume that EF is equal to one inch, that $a$ is equal to 0.04 inch, and that $d$ is equal to 0.25 inch. Then CD is equal to 0.9988 inch. Consequently a gage according to this illustrative example would permit a range of lengths or diameters extending from 0.9988 inch to 1.0000 inch. It is apparent that when tolerances are sufficiently close, a single gage may be so designed as to constitute both a go and no-go gage. Further, by providing on rod 11 an open scale 28 which may be read in connection with an end of sleeve 14, differences in diameter of a few ten-thousandths of an inch may be read directly.

In use, the gage 2 is placed in the inclined position shown in Fig. 1. Then it is inserted within the cylindrical hole or boring to be gaged, and the loop 25 drawn towards the bar 26, by lightly gripping the loop 25 and bar 26 simultaneously with the hand and gently closing the hand after the gage is inserted in the hole. Figure 2 shows the position of the gage after the loop 25 has been drawn towards bar 26.

Referring to Figures 1 to 4 inclusive, if it be assumed that no deformation of metal and/or glass occurs when the ends of the gage press against the wall of the cylindrical hole or boring, the contact between the gage and the cylindrical hole wall at each end of the gage is a line. Consequently, if the hole is slightly too small, one has to compress a considerable area of metal and/or glass to bring the gage into the upright position, and this is an important advantage in gaging diameters of cylindrical holes and borings. Tests have shown that a difference of 0.0001 inch makes a very large difference in the force required to bring the gage into the normal position. A person with the trained mechanic's sense of touch, therefore, is not required to operate with precision gages made according to the present invention. A further important advantage of this gage is that it is not necessary to bring the longitudinal axis of the gage into exact coincidence with a diameter of the cylindrical hole or boring in order to accurately gage the diameter of the hole or boring. This is due to the fact that all straight lines passing through the center 5 (see Fig. 3) and meeting the spherical surfaces 3 and 4 are not only equal and diameters of the spherical surfaces 3 and 4, but are also the intended or assigned diameter of the cylindrical hole or boring to be gaged by means of the gage.

With the modification of the gage illustrated in Figure 5, there is line contact between one end of the gage and the hole wall and a contact at the other end which rapidly increases in area as the material of the part being gaged, or the glass of the gage, compresses. There is, therefore, not much loss of sensitivity as compared with the modification of the gage illustrated in Figs. 1 to 4 inclusive, and there is the possibility of measuring small departures from nominal values of diameters of cylindrical holes by the use of the open scale referred to above.

A further distinct advantage of gages made in accordance with this invention is the long life of the gages. Because there is practically a line contact between the ends of the gage and the cylindrical holes, the wear is very slow. Even after the gage has worn away on a line on the ends, a fresh and correct area of surface can be brought into operation by merely rotating the gage about its longitudinal axis in its holder or mount.

The gages of the present invention may be made, for example, by grinding suitable lengths of glass rods at their ends, according to practices known in the lens grinding art, so that they will have the dimensions and spherical surfaces indicated above. A very effective manner of making the gages illustrated in Figures 1 to 4 inclusive, consists in first forming a glass sphere of the desired diameter and then removing by means of a core bit or drill a diametrical core from this sphere, as described and claimed in my application Ser. No. 548,877 now Patent No. 2,423,094 filed concurrently with this application. The modification of the invention disclosed in Figure 5 may, for example be prepared from one of these diametrical cores, by grinding one end thereof to a slightly different spherical curvature than the other by any suitable lens grinding method.

I claim:

1. A gage comprising a columnar portion having spherical surfaces at each end, the radii of curvature of said spherical surfaces being different, the centers of curvature of said spherical surfaces being spaced apart in a straight line, said straight line coincident with the longitudinal axis of said columnar portion and intersecting the centers of areas of the two spherical surfaces, and the one of said spherical surfaces which has the greater radius of curvature having a radius of curvature equal to half the maximum distance between the two spherical surfaces.

2. A gage comprising a columnar portion having spherical surfaces at each end, the radii of curvature of said spherical surfaces being different, the centers of curvature of said spherical surfaces being spaced apart in a straight line joining the point on one of said spherical surfaces with the point on the other of said spherical surfaces which are a maximum distance apart, and the one of said spherical surfaces which has the greater radius of curvature having a radius of curvature equal to half the maximum distance between the two spherical surfaces.

IRVINE C. GARDNER.

REFERENCES CITED

The following references are of record in the file of this patent:

UNITED STATES PATENTS

| Number | Name | Date |
|---|---|---|
| 1,395,768 | Pountney | Nov. 1, 1921 |
| 1,793,763 | Tornebohm | Feb. 24, 1931 |
| 2,353,297 | Donath | July 11, 1944 |

FOREIGN PATENTS

| Number | Country | Date |
|---|---|---|
| 74,415 | Sweden | May 31, 1932 |
| 166,668 | Great Britain | July 15, 1921 |
| 291,286 | Great Britain | May 31, 1928 |
| 633,638 | Germany | July 31, 1936 |
| 642,621 | France | Aug. 31, 1928 |